July 18, 1950 — L. K. MILLER — 2,515,607
VARIABLE PITCH PROPELLER
Filed Aug. 6, 1945 — 2 Sheets-Sheet 1
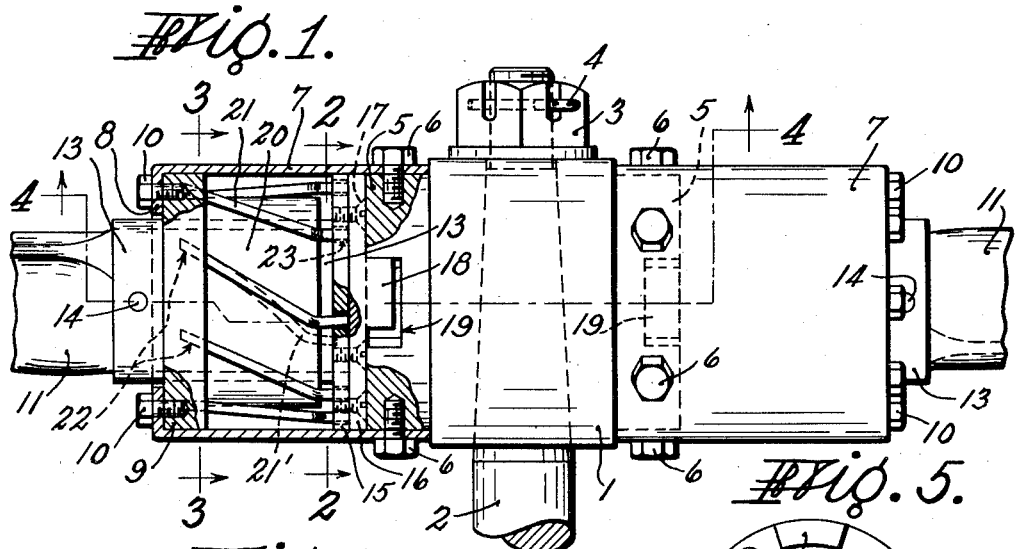
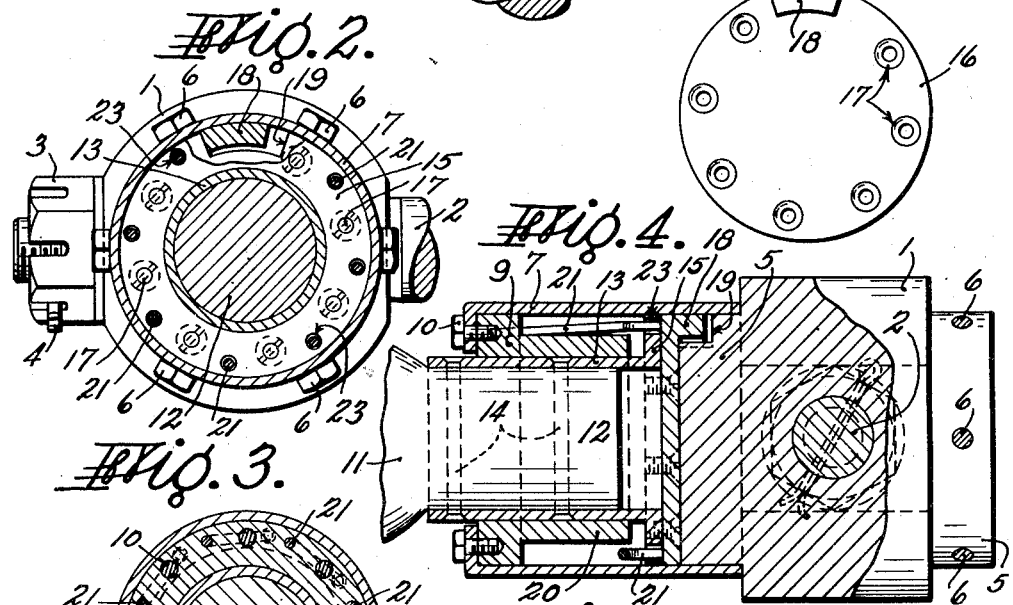
INVENTOR
LOYAL K. MILLER
BY Chapin + Neal
ATTORNEYS

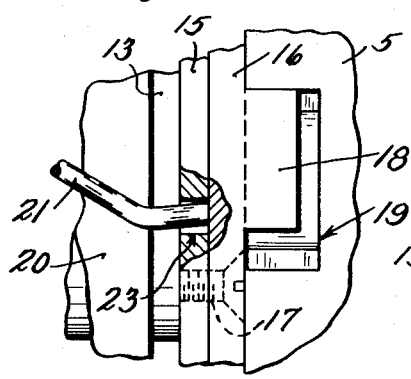
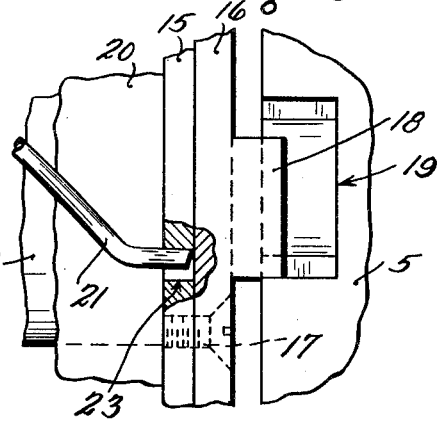
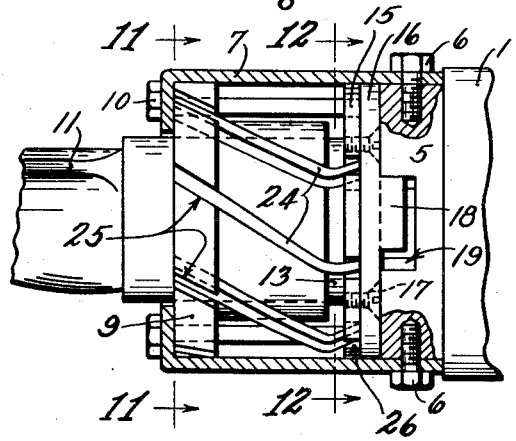
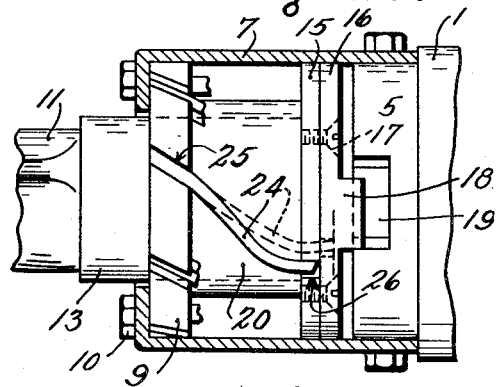
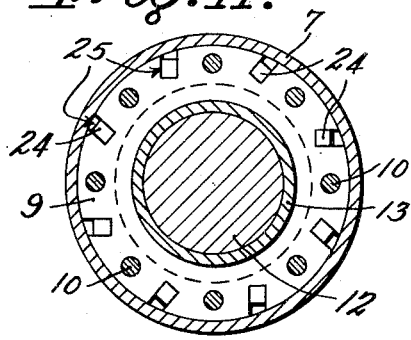
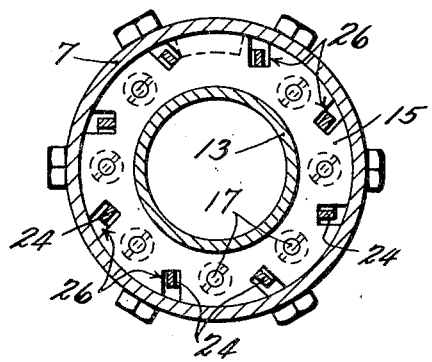

Patented July 18, 1950

2,515,607

UNITED STATES PATENT OFFICE 2,515,607

VARIABLE PITCH PROPELLER

Loyal K. Miller, Lawrence, Kans.

Application August 6, 1945, Serial No. 609,051

3 Claims. (Cl. 170—160.11)

This invention relates to improvements in airplane propellers which are automatically adjustable in pitch to accommodate the varying conditions arising for example during take-off and cruising. While numerous proposals have been made as to the design of such automatic variable pitch propellers, they have been intrinsically complex and expensive, and none has been suitable for use on small planes. It is one object of the invention to produce a simple and effective mechanism for automatically varying the pitch of a propeller. It is a further object to provide such a propeller in which the weight of the controlling mechanism will be concentrated near the hub and in which tendency to vibration will be lessened. A further object is to provide such a propeller in which dangerous conditions due to breakage of the controlling elements will be minimized. A further object is to provide such a propeller in which the operating mechanism will not be subjected to forces tending to cause it to bind or wear. A further object is to provide a design in which standard propeller blades may be used.

The invention will now be described with reference to the accompanying drawings, in which Fig. 1 is a plan view, partly broken away, of the propeller hub showing the preferred manner of mounting the blades;

Fig. 2 is a section on line 2—2 of Fig. 1;

Fig. 3 is a section on line 3—3 of Fig. 1;

Fig. 4 is a section on line 4—4 of Fig. 1;

Fig. 5 is a detail of a rotation limiting member carried by the shank of the propeller;

Fig. 6 is a detail of a sleeve in which the shank of the propeller is fixed;

Fig. 7 is a detail showing the propeller mounting in the position assumed when the plane is at rest or cruising;

Fig. 8 is a similar view showing the position assumed during take-off;

Fig. 9 is a detail, similar to a portion of Fig. 1 showing a modification;

Fig. 10 is a similar view showing the take-off position;

Fig. 11 is a section on line 11—11 of Fig. 9; and

Fig. 12 is a section on line 12—12 of Fig. 9.

The hub 1 is secured to the propeller shaft 2 in any desired way, as by a nut 3 and cotter pin 4. The hub has several shouldered portions 5, there being one such portion for each blade of the propeller. To each shouldered portion is secured as by screws 6 a casing 7 having an inturned flange 8. An annular fixed abutment or thrust member 9 is fastened as by screws 10 to the inside of this flange and serves to resist and limit outward motion of the propeller blade 11 in a manner to be described. The shank 12 of the blade fits snugly within a sleeve 13 to which it is secured firmly in any suitable way as by pins 14. The inner end of the sleeve 13 has an outwardly extending flange 15 bearing against the inner wall of the casing 7 with a sliding fit. A movable abutment 16, formed separately from the sleeve for convenience in manufacturing and assembling but functionally integral with it and with the propeller blade, is secured as by screws 17 to the outer face of the flange. This movable abutment has a lug 18 movable both axially and rotatably in a notch 19 in the shouldered portion 5 of the hub, the notch having a sufficient circumferential extent to permit only the desired amount of rotative movement of the propeller blade. Other forms of limit stops may obviously be substituted if desired. A limit to the outward movement of the blade is secured by contact of the flange 15 with a tubular extension 20 of the fixed abutment 9. This prevents serious unbalance in case of breakage of the controlling means now to be described.

The rotative movement of the blade is controlled by a circumferential series of rod-like springs 21, here shown as circular in cross-section, secured both to the movable and fixed abutments. The connection to one of the abutments, here shown as the fixed abutment 9, may be substantially rigid, while the connection to the other abutment preferably has some degree of freedom to avoid undue stress in the spring. Holes 22 in the fixed abutment are shown as receiving one end of the springs, both the holes and the springs being arranged at an angle so that the springs are given a generally helical position. At the other end the springs are bent so as to pass into slightly oversized holes 23 in the outwardly extending flange 15 of sleeve 13, these holes being generally parallel to the axis of the blade and being closed by the thrust member 16.

In the position of the parts assumed when the propeller shaft is not rotating or when the plane is cruising, the springs are preferably preloaded with a substantial initial strain. This can be done on assembly, and is for the purpose of preventing any change in pitch of the propeller until a predetermined threshold speed has been reached. As shown in Fig. 7, the end of each spring bears against the side of the hole in which it is placed, and being under strain holds the propeller in such angular position that the lug 18 is against one side of the notch. This keeps the propeller at maximum pitch, as is suitable for cruising.

As the engine is speeded up at take-off the centrifugal force on the blades increases, and each sleeve 13 is given a tendency to move outwardly through the fixed abutment 9. This is resisted by the circumferential series of spring rods, and until the centrifugal force becomes great enough to overcome the preloaded strain given to the springs on assembly no turning of the blade can occur. When the engine speed is enough so that the centrifugal force on the blades can overcome the preloading of the springs (preferably a speed slightly above cruising speed) the springs will be flexed as indicated in Fig. 8 and by the dotted lines for one of the springs at 21′ in Fig. 1. Since the springs are set at an angle this flexing will force the flange 15 to rotate in such a direction as to decrease the pitch of the blade, or in other words to cause the blade to turn in its socket so as to lie more nearly in the plane in which the blade travels. This turning is assisted by the air forces acting on the blade. Decreasing the pitch reduces the resistance of the propeller to rotating and allows the engine to pick up speed further and thus to increase the power delivered. A minimum pitch is, however, maintained at all times by the limited movement allowed to the lug 18 in the notch 19.

After the take-off, during which maximum power is desired, the throttle is partially closed and the engine speed thus reduced. The decreased centrifugal force on the blades will drop to a degree insufficient to resist the restoring action of the springs, and the pitch of the propeller will be held at a point determined by and equilibrium between the centrifugal force and the restoring action of the partially unbent springs. Generally the preloaded tension of the springs will be so adjusted that when the engine speed is reduced to the cruising range the blades will be returned to the position of maximum pitch shown in Figs. 1 and 7.

It was stated above that the holes 23 are preferably larger than the ends of the springs. The purpose of this is to allow the springs to flex gradually and not have a localized flex point, as might occur were the springs tightly held at both ends. While this construction is in general preferred, the springs may if desired be mounted so as to be either tight or loose at both ends. Where the loose mounting is used the ends of the springs are preferably bent as shown in Figs. 7 and 8 so that they extend generally in the direction of the axis of the propeller blade and always engage one side of the hole. A slight tilt is given to the springs as the pitch is changed, but by having the spring engage the hole squarely in the position of minimum pitch (Fig. 8) cutting of the spring under its condition of maximum stress by the corner of the hole will be avoided. The construction of the abutment 16 as separate from the flange 15 is of use in avoiding difficulty in making holes 23 all of uniform depth, as is desirable in order to have the centrifugal force borne equally by all the springs of the set. In this way the holes can be bored all the way through the flange, and when the abutment is screwed in place it forms a common bottom for the holes which lie in a single plane. By grinding off the free ends of the springs after the opposite ends have been mounted in the fixed abutment 9 uniform distribution of pressure to the several springs by the trust member 16 will be insured. Preloading of the springs can also be secured by this construction since the springs will be flexed as the screws 17 are tightened.

Figs. 9 to 12 show an alternative construction in which flat rod springs are used. Since all parts are the same except for the springs and their mounting the other parts will not be redescribed. In this case the flat springs 24 are set in slanting notches 25 milled in the fixed abutment 9, being retained within the notches by the casing 7. At the other end the springs are set into preferably oversized notches 26 in the flange 15, being retained by the casing and by the movable abutment 16. Since the flat springs are arranged on an angle the two sets of notches are set at oppositely inclined angles as shown in Figs. 11 and 12 to minimize the tendency to pull out of the notches as the springs flex. The operation is the same as in the first form.

I claim:

1. A variable pitch propeller having a hub, a casing on the hub for each blade, each casing receiving the shank of the propeller blade, each casing being formed of a cylindrical body with an inturned outer end, a sleeve secured to the shank of the blade and extending within the casing, an annular thrust member carried by the casing and surrounding the sleeve and having sliding engagement therewith, a second thrust member carried by the sleeve within the casing, a circumferential series of rod-like springs extending on an angle between the two thrust members, the springs being fixed at one end to one thrust member and being received loosely in holes in the second thrust member, the springs being inclined around the axis of the blade in the same direction as that in which the edges of the blade are displaced from a plane passing through the axis of the blade at right angles to the axis of rotation of the propeller.

2. A variable pitch propeller comprising a hub provided with radially directed housings one for the shank of each propeller blade, a spring receiving abutment carried by each housing, a spring receiving abutment carried by the inner end of the shank of each propeller blade, at least one of said spring receiving abutments being composed of a collar to receive the axial thrust of a series of rod springs and an adjacent collar having a series of holes to receive and position the springs, said holes being sufficiently larger than the springs to permit the latter to bear against one side of the hole without binding, and a circumferential series of rod-like springs positioned around the shank in generally helical formation, the springs being inclined around the axis of the blade in the same direction as that in which the edges of the blade are displaced from a plane passing through the axis of the blade at right angles to the axis of rotation of the propeller.

3. A variable pitch propeller comprising a hub with radially directed housings one for the shank of each propeller blade, a spring receiving abutment carried by each housing, a second spring receiving abutment carried by the inner end of the shank of each propeller blade, a circumferential series of rod-like springs positioned around the shank in generally helical formation, the springs being inclined around the axis of the blade in the same direction as that in which the edges of the blade are displaced from a plane passing through the axis of the blade at right angles to the axis of rotation of the propeller, and interengaging members coupling the abutments together to prevent relative motion between them to a position in which strain is removed from the springs.

LOYAL K. MILLER.

REFERENCES CITED

The following references are of record in the file of this patent:

UNITED STATES PATENTS

| Number | Name | Date |
| --- | --- | --- |
| 1,953,682 | Kelm | Apr. 3, 1934 |
| 2,215,609 | Gilbert | Sept. 24, 1940 |
| 2,219,303 | Fraser | Oct. 29, 1940 |
| 2,395,867 | Hackethal | Mar. 5, 1946 |

FOREIGN PATENTS

| Number | Country | Date |
| --- | --- | --- |
| 190,227 | Switzerland | Apr. 15, 1937 |